United States Patent
Ono et al.

(10) Patent No.: US 8,991,735 B2
(45) Date of Patent: Mar. 31, 2015

(54) WEBBING TAKE-UP DEVICE

(71) Applicant: Kabushiki Kaisha Tokai-Rika-Denki-Seisakusho, Aichi-ken (JP)

(72) Inventors: Takashi Ono, Aichi-ken (JP); Yasunori Hata, Aichi-ken (JP); Akira Sumiyashiki, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 142 days.

(21) Appl. No.: 13/760,389

(22) Filed: Feb. 6, 2013

(65) Prior Publication Data

US 2013/0200195 A1 Aug. 8, 2013

(30) Foreign Application Priority Data

Feb. 8, 2012 (JP) ................ 2012-025402

(51) Int. Cl.
  *B60R 22/40* (2006.01)
  *B60R 22/34* (2006.01)
(52) U.S. Cl.
  CPC ................ *B60R 22/34* (2013.01); *B60R 22/40* (2013.01); *B60R 2022/403* (2013.01)
  USPC .................... 242/384.4; 297/216.13; 297/478

(58) Field of Classification Search
  USPC ............. 242/384.4; 297/216.13–216.14, 478, 297/480
  See application file for complete search history.

(56) References Cited

U.S. PATENT DOCUMENTS

| 5,716,102 A * | 2/1998 | Ray et al. ................ 297/478 |
| 6,015,164 A * | 1/2000 | Yano ..................... 280/806 |
| 6,068,340 A * | 5/2000 | Yano et al. ............ 297/478 |
| 6,254,191 B1 * | 7/2001 | Yamamoto et al. ...... 297/478 |
| 2013/0161437 A1 * | 6/2013 | Ono et al. ............. 242/384 |

FOREIGN PATENT DOCUMENTS

JP       3767197 B2     4/2006

* cited by examiner

*Primary Examiner* — Sang Kim
(74) *Attorney, Agent, or Firm* — Roberts Mlotkowski Safran & Cole P.C.

(57) ABSTRACT

A length direction base end side of a wire passes through a retaining spring mounting hole formed in a case, and is anchored to an anchor tag that is indirectly retained by a pulley. A spring is provided in the retaining spring mounting hole, and a base end of a tube is retained to the spring through a metal cylinder body. A spring-side step portion of the spring is pressed contact to a mounting portion-side step portion of the retaining spring mounting hole so the spring is retained. When the tube is pulled towards an opening side of the retaining spring mounting hole, the spring moves and the spring-side step portion makes press contact with, and is once again retained, by a different step of the mounting portion-side step portion.

8 Claims, 14 Drawing Sheets

REAR TILTED (RECLINING) STATE

FRONT TILTED STATE

WEBBING TAKE-UP DEVICE

CROSS-REFERENCE TO RELATED APPLICATION

This application claims priority under 35 USC 119 from Japanese Patent Application No. 2012-025402 filed Feb. 8, 2012, the disclosure of which is incorporated by reference herein.

BACKGROUND OF THE INVENTION

1. Field of the Invention

The present invention relates to a webbing take-up device configuring a vehicle seat belt device.

2. Related Art

Japanese Patent No. 3767197 (Patent document) discloses a webbing take-up device (referred to as a seat belt retractor in the Patent document) provided inside a seat back of a vehicle seat that has what is referred to as a reclining mechanism. The webbing take-up device is provided with an acceleration sensor for actuating a locking mechanism when the vehicle decelerates suddenly, and a sensor case of the acceleration sensor is provided to be capable of turning with respect to a frame or the like of the webbing take-up device.

One end of a cable is anchored to the sensor case through a wheel, and the sensor case turns by the cable moving in the cable length direction. The other end of the cable is anchored to a rack such that the rack slides when a pinion rotates integrally with the seat back due to the seat back tilting, thereby the cable is moved towards the one end side or the other end side in the cable length direction. The sensor case is accordingly maintained substantially horizontally according to the seat back tilt angle.

In the configuration disclosed in the Patent document, the rack is divided into a side that meshes with the pinion and a side that retains the other end of the cable, and a position of the join between the pinion meshing side and the cable other end retaining side can be shifted in the rack slide direction. The initial rotation position of the pinion and the initial position of the sensor case are thus adjustable. However, in such a configuration, shift of the position of the join between pinion meshing side and the cable other end retaining side results in an increase the rack dimension in the length direction thereof.

SUMMARY OF THE INVENTION

In consideration of the above circumstances, the present invention is to provide a webbing take-up device that can prevent or suppress an increase in size in a member anchoring a base end of a coupling member, such as a cable, that operates an acceleration sensor.

A webbing take-up device according to a first aspect of the present invention includes: a take-up device main body that is provided at a seat back that is capable of tilting with respect to a seat cushion configuring a vehicle seat about an axis whose axial direction is along a width direction of the seat, the take-up device main body including a spool on which a webbing is taken up by rotation in a take-up direction, and a locking mechanism that restricts, by actuating, rotation of the spool in a pull-out direction that is an opposite direction to the take-up direction; an acceleration sensor that includes a housing on which is placed an inertia mass body that actuates the locking mechanism by inertia moving, the housing being provided at the take-up device main body so as to be capable of turning with respect to the take-up device main body about a specific turning axis; a tilt detection section including a support body that is provided at the seat back, and including a moving body that is provided at the support body and that moves relative to the support body accompanying tilting of the seat back with respect to the seat cushion; an elongated coupling member whose leading end in a length direction thereof is anchored to the housing of the acceleration sensor and whose base end in the length direction is anchored to the moving body of the tilt detection section, the coupling member turning the housing of the acceleration sensor with respect to the take-up device main body by moving together with the moving body; and a tube-shaped tube whose leading end in a length direction thereof is directly or indirectly integrally anchored to the take-up device main body and whose base end in the length direction is retained directly or indirectly at the support body of the tilt detection section so as to be capable of moving with respect to the support body of the tilt detection section towards at least one of a side of the base end in the length direction of the coupling member or a side of the leading end in the length direction of the coupling member, the coupling member passing through the inside of the tube so as to be movable along the length direction.

According to the webbing take-up device of the first aspect of the present invention, when the seat back tilts with respect to the seat cushion about the axis with the axial direction in the seat width direction, the take-up device main body and the support body of the tilt detection section tilt together with the seat back. The support body of the tilt detection section is provided with the moving body, and the moving body moves with respect to the support body when the seat back tilts. The length direction base end of the coupling member moves together with the moving body when the moving body moves with respect to the support body due to the length direction base end of the coupling member being anchored to the moving body.

The length direction leading end of the coupling member is anchored to the housing of the acceleration sensor that is provided at the take-up device main body so as to be capable of turning about the specific turning axis with respect to the take-up device main body. The length direction leading end of the coupling member moves due to movement of the length direction base end of the coupling member, turning the housing of the acceleration sensor with respect to the take-up device main body. Tilting of the housing of the acceleration sensor can accordingly be suppressed even when the take-up device main body tilt-moves together with the seat back. Accordingly, even when the seat back is tilted, the acceleration sensor can operate similarly to when in a non-tilted seat back state.

The coupling member passes through the inside of the tube. The leading end of the tube is directly or indirectly integrally anchored to the take-up device main body. The base end of the tube is retained to the support body of the tilt detection section, so as to be capable of moving with respect to the support body of the tilt detection section towards at least one of the length direction leading end side of the coupling member or the length direction base end side of the coupling member.

Accordingly, when the base end of the tube is moved in the coupling member length direction with respect to the support body of the tilt detection section such that the base end of the tube approaches the length direction base end of the coupling member, the coupling member moves towards its length direction leading end side relative to the tube. The coupling member accordingly extends out further from the leading end of the tube. On the other hand, when the base end of the tube is moved in the coupling member length direction with respect to the support body of the tilt detection section such that the base end of the tube moves away from the length direction base end of the coupling member, the coupling member moves towards the length direction base end side relative to the tube.

The length direction leading end side of the coupling member is accordingly pulled into the tube. In the webbing take-up device of the present invention, the initial position of the housing of the acceleration sensor with respect to the initial position of the moving body can accordingly be adjusted without changing the anchoring position of the coupling member to the moving body. A reduction in size of the moving body is accordingly made possible since there is no need for space required to allow change in the anchoring position of the coupling member to the moving body.

A webbing take-up device of a second aspect of the present invention is the first aspect of the present invention further including a retention section to which the base end of the tube is anchored and that is retained at the support body of the tilt detection section, the retention section moving, by being operated, towards at least one of the side of the base end in the length direction of the coupling member or the side of the leading end in the length direction of the coupling member with respect to the support body.

According to the webbing take-up device of the second aspect of the present invention, the base end of the tube is retained in the retention section that is retained to the support body of the tilt detection section. The retention section is move, by being operated, towards at least one of the length direction base end side of the coupling member or the length direction leading end side of the coupling member with respect to support body of the tilt detection section. By operating of the retention section, the length direction base end of the tube can be moved approaching towards or away from the length direction base end of the coupling member.

A webbing take-up device of a third aspect of the present invention is the second aspect of the present invention wherein movement of the retention section along the length direction of the coupling member with respect to the support body is restricted by friction between the retention section and the support body due to the retention section being in resilient press contact with the support body.

According to the webbing take-up device of the third aspect of the present invention, the retention section is in resilient press contact with the support body of the tilt detection section, and is retained in this state by friction with the support body. When the retention section is operated so as to resiliently deform against this resilience, the retention of the retention section by the support body is released, and the length direction base end of the tube can be moved approachingly towards or away from the length direction base end of the coupling member.

A webbing take-up device of a fourth aspect of the present invention is the second aspect of the present invention wherein the retention section includes a male thread portion that is screwed with a female thread portion formed at the support body, and that is moved, being guided by the female thread portion, in the length direction of the coupling member by the male thread portion rotating about a center axis line of the female thread portion.

According to the webbing take-up device of the fourth aspect of the present invention, the retention section is configured including the male thread portion, the male thread portion of the retention section being screwed together with the female thread portion formed to the support body of the tilt detection section. The retention section moves along the center axis direction of the female thread portion when the male thread portion is operated to be turned about the center axis of the female thread portion. The retention section accordingly moves in the coupling member length direction. The length direction base end of the tube can be moved approachingly towards or away from the length direction base end of the coupling member by moving the retention section in this way.

A webbing take-up device of a fifth aspect of the present invention is the second aspect of the present invention wherein the retention section includes: a contact portion that is provided at either the support body or the tube side; and a resilient interference portion that is provided at whichever of the support body or the tube side is not provided with the contact portion, that is formed so as to be softer than the contact portion and capable of resilient deformation, and that faces the contact portion along the length direction of the coupling member at a base end side of the tube, the resilient interference portion interfering with the contact portion to restrict relative displacement of the contact portion in the length direction of the coupling member, and undergoing resilient deformation by a pushing force of a specific magnitude or greater from the contact portion along the length direction of the coupling member to release restriction of the contact portion from relative displacement.

According to the webbing take-up device of the fifth aspect of the present invention, the contact (abut) portion is provided at one member out of the support body of the tilt detection section or to the base end of the tube side, with the resilient interference portion provided at the other member. The contact portion and the resilient interference portion face each other along the length direction of the coupling member at a length direction base end side of the tube, and relative displacement of the contact portion with respect to the resilient interference portion along the coupling member length direction is restricted due to the resilient interference portion contacting (abutting) the contact portion. Movement of the base end of the tube with respect to the support body along the coupling member length direction is accordingly restricted.

The resilient interference portion is formed so as to be softer than the contact portion and also capable of resilient deformation. Accordingly, when the pushing (pressing) force (or a pushing (pressing) reaction force) of the specific magnitude or greater is imparted to the resilient interference portion from the contact portion in the coupling member length direction, the resilient interference portion undergoes resilient deformation and the restriction on relative displacement of the contact portion by the resilient interference portion is released, and the length direction base end of the tube can be moved approachingly towards or away from the length direction base end of the coupling member.

It is possible in the third aspect that the retention section is configured including a retention portion that is moved by being operated and to which the base end of the tube is anchored, and a resilient press contact member that is attached to the retention portion and that is movable by the retention portion being moved, the resilient press contact member being in resilient press contact with the support body.

It is possible in the fourth aspect that the male thread portion is formed on an outer peripheral portion of a retention portion configuring the retention section that is moved by being operated and to which the base end of the tube is anchored, and the male thread portion is screwed with the female thread portion which is a female thread hole formed at the support body, It is possible in the fifth aspect that the retention section is configured including a retention portion that is moved by being operated and to which the base end of the tube is anchored, and the contact portion is provided at the retention portion, and the resilient interference portion is provided at the support body.

It is possible in the fifth aspect that the retention section is configured including a retention portion that is moved by being operated and to which the base end of the tube is anchored, and the resilient interference portion is provided at the retention portion, and the contact portion is provided at the support body.

As explained above, an increase in size can be prevented or suppressed in a member anchoring a base end of a coupling member, such as a cable, that is for operating an acceleration sensor.

BRIEF DESCRIPTION OF THE DRAWINGS

Embodiments of the invention will be described in detail with reference to the following figures, wherein.

DETAILED DESCRIPTION OF THE INVENTION

Configuration of the Present Exemplary Embodiment

Figure 11:
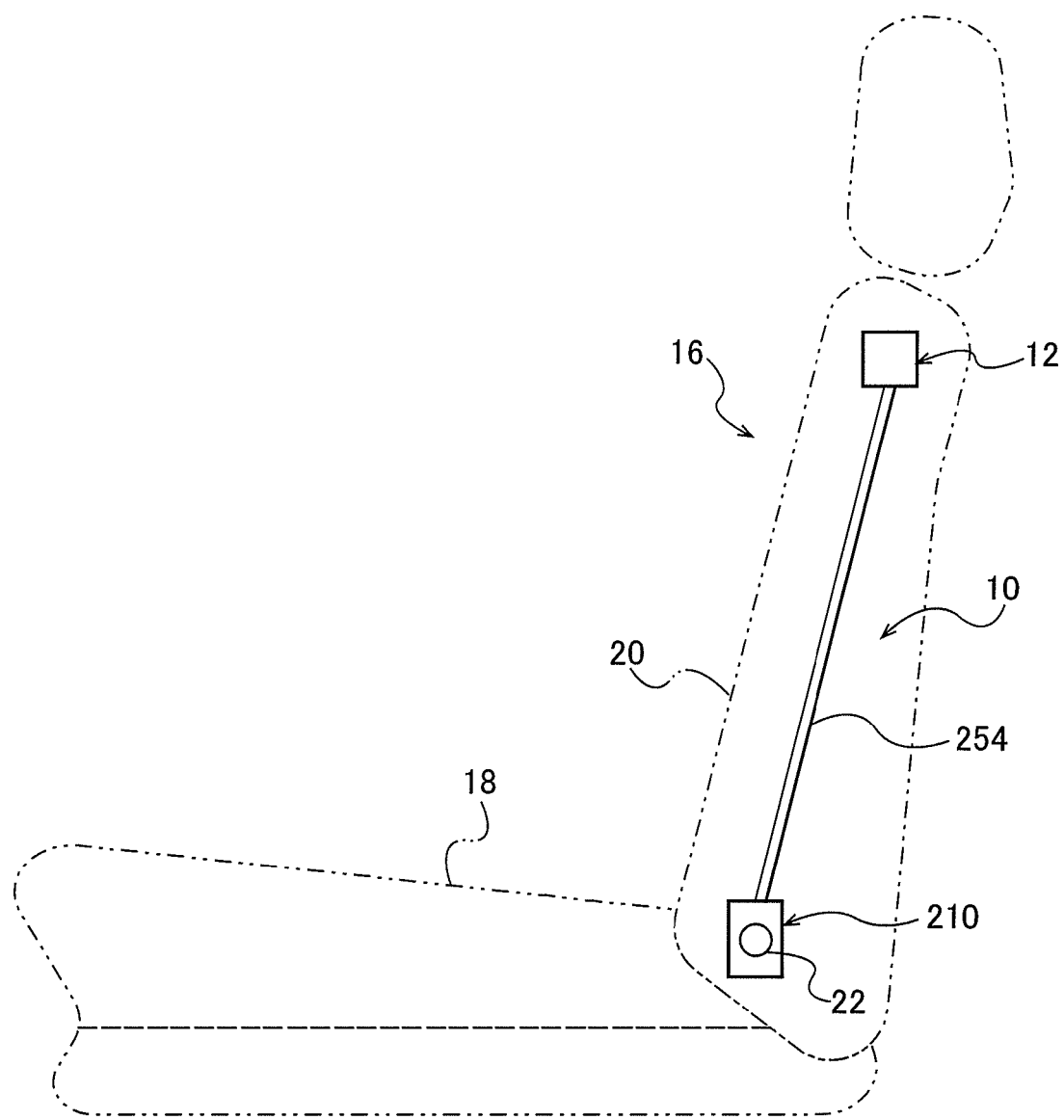
FIG. 11 is a schematic side view of a seat applied with a webbing take-up device according to an exemplary embodiment of the present invention.

FIG. 11 is a side view of a seat 16 installed with a webbing take-up device 10 according to an exemplary embodiment of the present invention.

As shown in FIG. 11, a seat back 20 configuring a backrest of the seat 16 is provided at the rear of a seat cushion 18 configuring the seat 16. A shaft 22 with axial direction aligned in the seat 16 width direction is provided at a lower end side of the seat back 20, and the seat back 20 is tiltable about the shaft 22 such that an upper end side thereof can tilt towards the rear and front.

A take-up device main body 12 configuring the webbing take-up device 10 is provided at the inside of the seat 16 at a width direction one end side (vehicle width direction outer side) of the upper end side of the seat 16.

Outline of the Overall Configuration of the Take-Up Device Main Body 12

Figure 7:
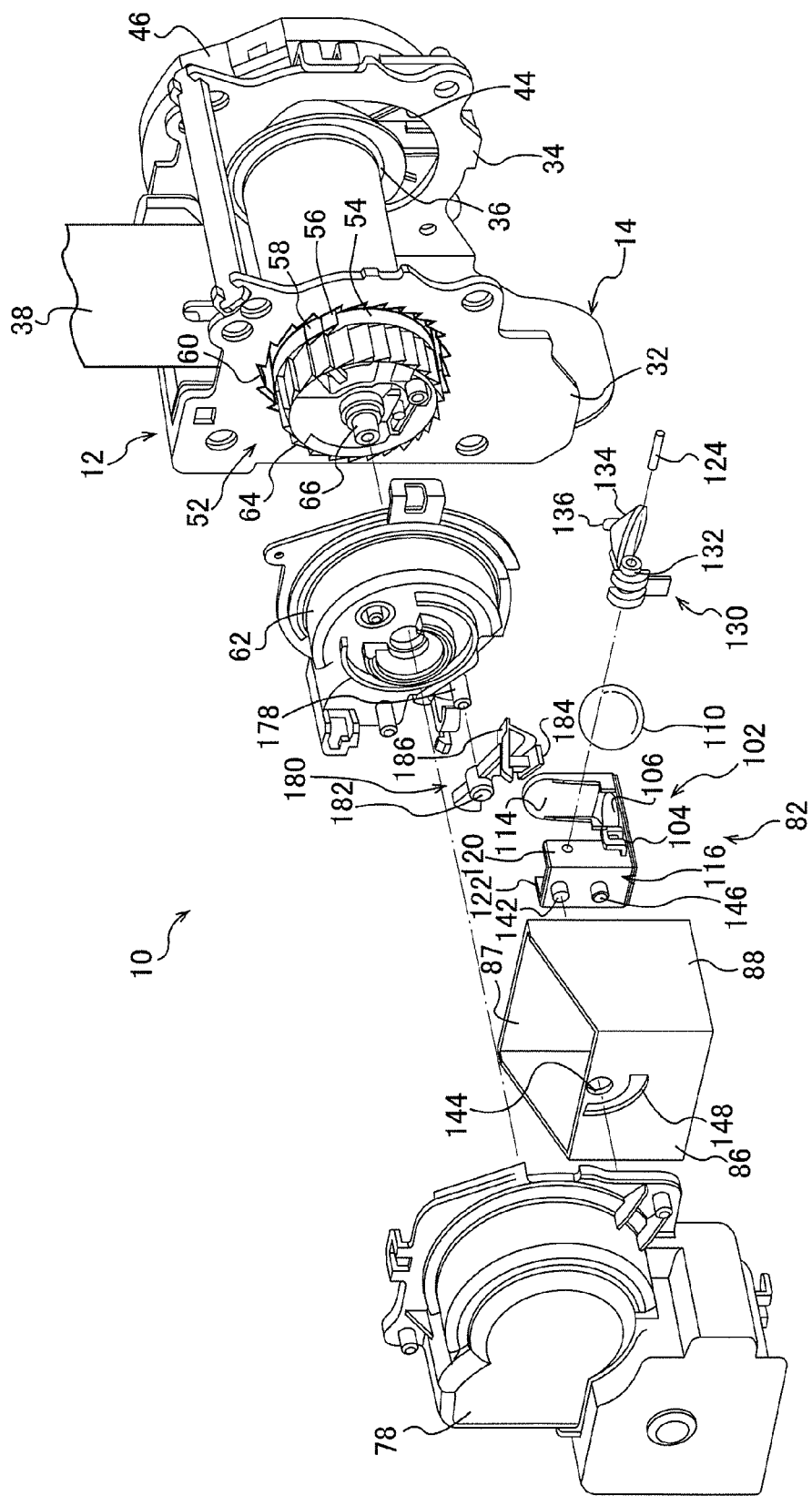
FIG. 7 is an exploded perspective view schematically illustrating a take-up device main body and an acceleration sensor of a webbing take-up device according to an exemplary embodiment of the present invention.

FIG. 7 is a schematic exploded perspective view of the configuration of the take-up device main body 12. As shown in FIG. 7, the take-up device main body 12 is equipped with a frame 14. The frame 14 is fastened and integrally fixed to for example a frame (seat back framework) of the seat back 20 by for example bolts.

The frame 14 is provided with a pair of leg plates 32 and 34. The leg plates 32 and 34 are respectively formed in plate shapes with their thickness direction oriented along the seat back width direction, so as to face each other along the seat back width direction. A spool 36 is provided between the leg plate 32 and the leg plate 34. The spool 36 is configured as a hollow shaft member with the axial direction aligned along the facing direction of the leg plate 32 and the leg plate 34.

A length direction base end side of webbing 38 is anchored (caught) to the spool 36. The webbing 38 is formed in an elongated belt shape with its width direction aligned along the axial direction of the spool 36. The webbing 38 is taken up and stored at an outer peripheral portion of the spool 36 from the length direction base end side when the spool 36 rotates about its axial center in a take-up direction that is one direction. When the webbing 38 is pulled towards a webbing 38 leading end side, the webbing 38 that has been taken up on the spool 36 is pulled out, and the spool 36 rotates in a pull-out direction that is the opposite direction to the take-up direction.

The inside of the spool 36 is for example provided with a rod-shaped energy absorption section referred to by such terms as a torsion shaft. The energy absorption section is connected to the spool 36 at a leg plate 34 side of the spool 36, in a state in which relative rotation of the energy absorption section with respect to the spool 36 is restricted. The leg plate 34 side of the energy absorption section also passes through a through hole 44 formed in the leg plate 34 and projects to the outside (the opposite side of the leg plate 34 to the leg plate 32) of the leg plate 34.

A spring case 46 is attached to the leg plate 34 at the outside of the leg plate 34 (the opposite side of the leg plate 34 to the leg plate 32). A spiral spring serving as a spool biasing member is housed inside the spring case 46. The spiral direction outside end of the spiral spring is anchored to the spring case 46, and the spiral direction inside end is directly or indirectly anchored to the energy absorption section. The spiral spring is wound tighter when the spool 36 and the energy absorption section rotate together in the pull-out direction, and the spool 36 is biased in the take-up direction through the energy absorption section.

A lock base 54 configuring a locking mechanism 52 is provided to the leg plate 32 side of the spool 36. The lock base 54 is mounted to a leg plate 32 side end portion of the spool 36 so as to be capable of coaxial relative rotation with respect to the spool 36. The lock base 54 is connected to a leg plate 32 side portion of the energy absorption section mentioned above in a state in which relative rotation with respect to the energy absorption section is restricted. The lock base 54 is accordingly connected through the energy absorption section to the spool 36 in a state in which relative movement with respect to the spool 36 is restricted.

A pawl housing portion 56 open at an outer peripheral face is formed to the lock base 54. A locking pawl 58 is provided inside the pawl housing portion 56. The lock base 54 passes through a ratchet hole 60 formed at the leg plate 32, and ratchet teeth formed at a leading end side of the locking pawl 58 mesh with ratchet teeth of the ratchet hole 60 when a portion of the locking pawl 58 goes out from the pawl housing portion 56. Rotation of the lock base 54 in the pull-out direction is restricted in this state, and rotation of the spool 36 in the pull-out direction is indirectly restricted.

A sensor holder 62 is attached to the leg plate 32 at the leg plate 32 outside (the opposite side of the leg plate 32 to the leg plate 34). A portion of the sensor holder 62 is formed in a bottomed shape that is open towards the leg plate 32 side, and a V-gear 64 is provided at the inside thereof. A shaft portion 66 extends from the energy absorption section mentioned above towards the sensor holder 62 side so as to correspond to the V-gear 64. The shaft portion 66 is provided coaxially with the spool 36, and the V-gear 64 is rotatably supported by the shaft portion 66.

The V-gear 64 is provided with a spring, not shown in the drawings. A portion of this spring engages with the lock base 54. The spring is pressed by the lock base 54 when the lock base 54 rotates in the pull-out direction, and the spring presses the V-gear 64 in the pull-out direction. The V-gear 64 is accordingly capable of rotation in the pull-out direction so as to follow the lock base 54. The lock base 54 is also capable of relative rotation in the pull-out direction with respect to the V-gear 64 by resiliently deforming the spring. A portion of the locking pawl 58 is engaged with the V-gear 64. Interlockingly to the relative rotation in the pull-out direction of the lock base 54 with respect to the V-gear 64, the locking pawl 58 moves in the direction to go out of the pawl housing portion 56, so as to mesh with the ratchet teeth of the ratchet hole 60.

A sensor cover 78 is provided at the opposite side of the sensor holder 62 to the leg plate 32. The sensor cover 78 is configured in a bottomed shape that is open towards the leg plate 32 side, and is attached to the leg plate 32. An acceleration sensor 82 is provided inside the sensor cover 78. The acceleration sensor 82 is provided with a hanger 84. The hanger 84 is provided with support walls 86 and 87. The support wall 86 and the support wall 87 are formed with plate shapes and face each other along the same direction as the axial direction of the spool 36, or a direction inclined in the seat up-low direction with respect to the axial direction of the spool 36 about an axis whose axial direction is along the seat front-rear direction.

Peripheral walls 88 are formed between the support walls 86 and 87. The peripheral walls 88 are formed along portions of the outer periphery of the support walls 86 and 87. The hanger 84 is accordingly configured as a hollow box shape open at portions at which the peripheral walls 88 are not formed. The hanger 84 is attached to the frame 14 by fixing the support wall 87 to the leg plate 32.

A sensor housing 102 formed by for example molding from a synthetic resin material entirely is provided between the support wall 86 and the support wall 87 of the hanger 84. The sensor housing 102 is provided with a placement portion 104. The placement portion 104 is formed with a curved indent shaped curved face 106 at a thickness direction upper side. The curved face 106 has a substantially circular shape in plan view and is open towards the upper side. A spherical body 110 serving as an inertia mass body is placed on the curved face 106.

A vertical wall 114 projects upwards from a support wall 87 side end portion of the placement portion 104. A support wall 116 is provided at the support wall 86 side of the placement portion 104. The support wall 116 is provided with a vertical wall 118. The vertical wall 118 projects upwards from a support wall 86 side end portion of the placement portion 104 and faces the vertical wall 114 along the facing direction of the support walls 86 and 87.

A lateral wall 120 extends from a width direction one end of the vertical wall 118 towards the vertical wall 114 side. A lateral wall 122 extends from the width direction other end of the vertical wall 118 towards the vertical wall 114 side. The support wall 116 accordingly configures in plan view a recessed shape open towards the vertical wall 114 side. A support shaft 124 is provided in the vicinity of an upper end portion of the support wall 116. The support shaft 124 is a shaft member whose axial direction is along the facing direction of the lateral wall 120 and the lateral wall 122. A one end of the support shaft 124 is supported by the lateral wall 120 and the other end of the support shaft 124 is supported by the lateral wall 122.

A sensor lever 130 is provided between the lateral wall 120 and the lateral wall 122. The sensor lever 130 is provided with a base portion 132, and the support shaft 124 passes through the base portion 132. The sensor lever 130 is accordingly supported so as to be capable of rotating (swinging) about the support shaft 124. The sensor lever 130 is also provided with a hat portion 134. The hat portion 134 is formed with a shallow circular cone shaped external appearance. A bottom face of the hat portion 134 is configured with a curved or sloping face with a recessed shape open towards the opposite side to an apex portion of the cone. The bottom face covers over the spherical body 110 placed on the curved face 106 of the placement portion 104.

The hat portion 134 accordingly swings about the support shaft 124 so as to rise up when the spherical body 110 runs up over the curved face 106 towards the rim (edge) portion of the curved face 106. A pressing projection 136 is formed to the hat portion 134 projecting substantially upwards (namely to the opposite side of the hat portion 134 to the bottom face). The pressing projection 136 pushes a V-pawl 180, described later, upwards when the hat portion 134 swings about the support shaft 124 so as to rise up.

A rotating (swing) shaft 142 is formed in the vicinity of an upper end portion of the vertical wall 118 of the support wall 116. The swing shaft 142 is formed projecting from the opposite side face of the vertical wall 118 to the vertical wall 114, along the same direction as the axial direction of the spool 36. The swing shaft 142 is supported by a shaft receiving hole 144 formed in the support wall 86 of the hanger 84 so as to be capable of swinging. A guide pin 146 is formed projecting from the vertical wall 118 at a position further to the lower side than the position on the vertical wall 118 at which the swing shaft 142 is formed. The projection direction of the guide pin 146 from the vertical wall 118 is set along the same direction as the projection direction of the swing shaft 142 from the vertical wall 118. The guide pin 146 enters a guide hole 148 formed in the support wall 86 of the hanger 84.

The guide hole 148 is configured as an elongated hole that curves with a curvature centered on the shaft receiving hole 144. The guide pin 146 enters the inside of the guide hole 148. The swing range of the sensor housing 102 about the swing shaft 142 is thereby limited to between a contact position of the guide pin 146 with a length direction one end of the guide hole 148 and a contact position of the guide pin 146 with the length direction other end of the guide hole 148.

Figure 10:
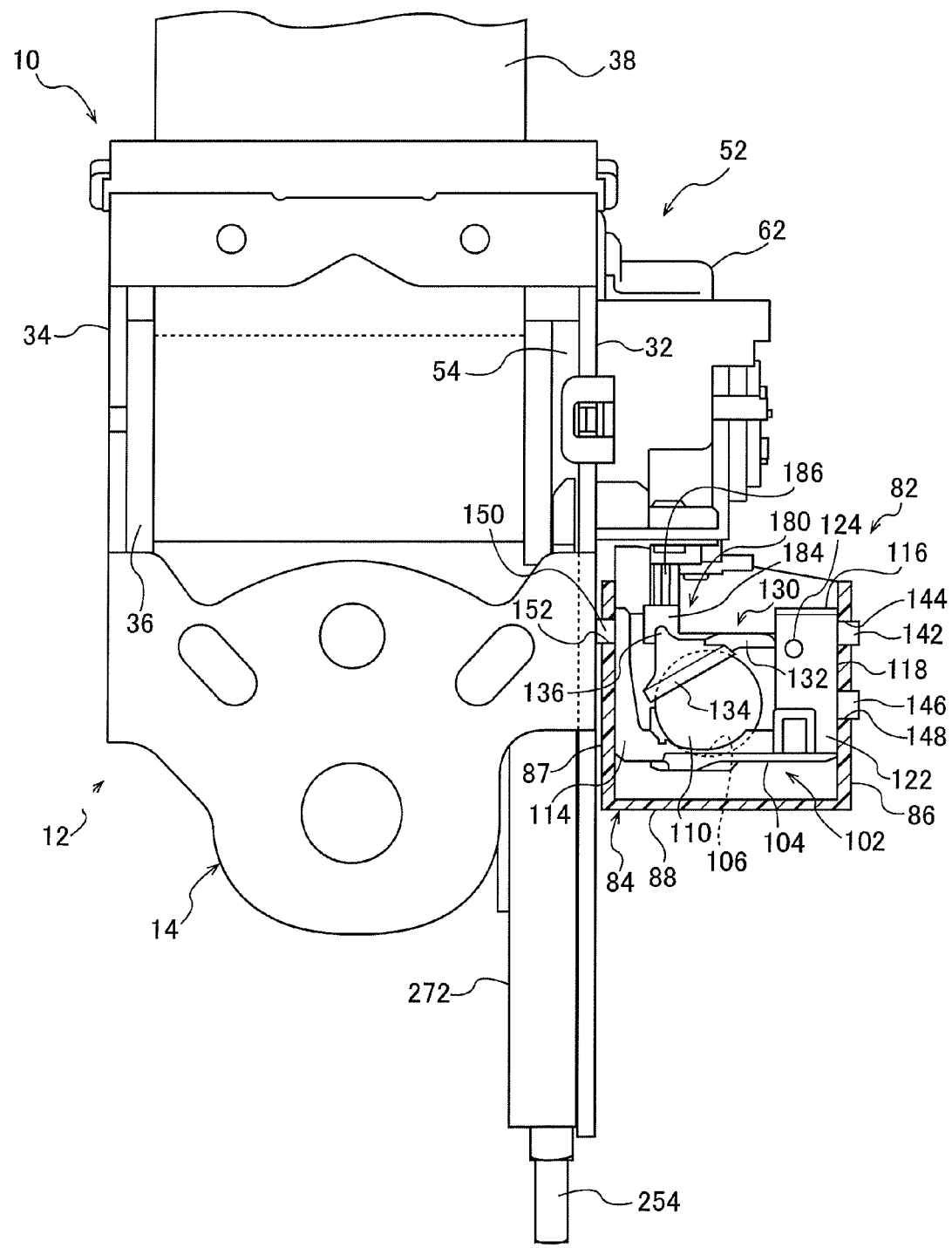
FIG. 10 is a side view schematically illustrating a tilt detection section.

As shown in FIG. 10, a rotating (swing) shaft 150 is also formed to the vertical wall 114. The swing shaft 150 is formed projecting coaxial to the swing shaft 142 from an opposite side face of the vertical wall 114 to the vertical wall 118. The swing shaft 150 is supported so as to be capable of swinging by a shaft receiving hole 152 formed in the support wall 87 of the hanger 84. The forming position of the swing shaft 142 in the vertical wall 118 of the support wall 116 and the forming position of the swing shaft 150 in the vertical wall 114 are set further towards the upper side than the position of the center of gravity of the sensor housing 102 in a state in which the sensor lever 130 has been mounted to the support wall 116 and the spherical body 110 has been placed on the curved face 106 of the placement portion 104.

A support shaft 178 is formed projecting from the sensor holder 62 towards the opposite side of the sensor holder 62 to the leg plate 32. The support shaft 178 is set with its axial direction along the same direction as the axial direction of the spool 36. A base portion 182 of the V-pawl 180 is supported so as to be capable of rotating (swinging) about the support shaft 178. The V-pawl 180 is provided with a plate shaped pressure receiving plate 184. The pressure receiving plate 184 is positioned to the upper side of the pressing projection 136 of the sensor lever 130. The size of the pressure receiving plate 184 is set such that the lower side face of the pressure receiving plate 184 faces the pressing projection 136 within the swing range of the sensor housing 102 about the swing shaft 142, between the state of contact of the guide pin 146 with the one end of the guide hole 148 and the state of contact of the guide pin 146 with the other end of the guide hole 148.

The V-pawl 180 is further provided with an engagement claw 186. An opening, not shown in the drawings, is formed in the sensor holder 62 so as to correspond to the engagement claw 186. The portion of the sensor holder 62 housing the V-gear 64 and the outside of the sensor holder 62 are in communication with each other through this opening. The pressing projection 136 pushes the pressure receiving plate 184 upwards when the sensor lever 130 swings about the support shaft 124 so as to rise up, so the engagement claw 186 meshes with ratchet teeth formed at the outer peripheral portion of the V-gear 64. Rotation of the V-gear 64 in the pull-out direction is thus restricted when the engagement claw 186 meshes with the ratchet teeth of the V-gear 64.

Configuration of the Reclining Sensor 210

As shown in FIG. 11, the webbing take-up device 10 is provided with a reclining sensor 210 that serves as a tilt detection section and configures the webbing take-up device 10 together with the take-up device main body 12. As shown in FIG. 11, the reclining sensor 210 is provided at the inside of the seat back 20, at a lower end side and at the width direction other end side (vehicle width direction central side) of the seat back 20.

Figure 1:
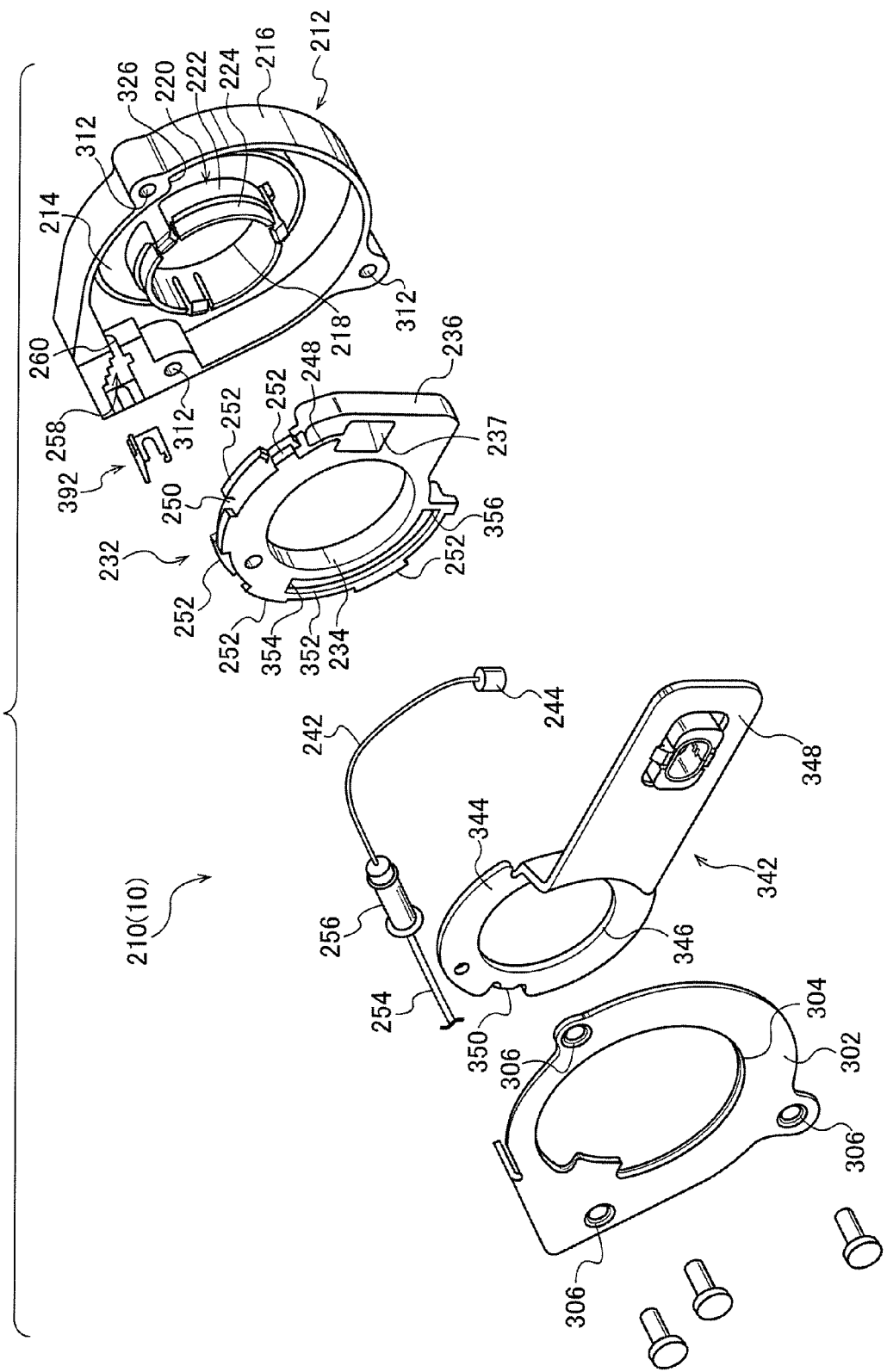
FIG. 1 is an exploded perspective view schematically illustrating a configuration of a tilt detection section of a webbing take-up device according to an exemplary embodiment of the present invention.

FIG. 1 is an exploded perspective view schematically illustrating the configuration of the reclining sensor 210. As shown in FIG. 1, the reclining sensor 210 is provided with a case 212. The case 212 is provided with a plate shaped bottom wall 214 with a thickness direction aligned along the seat 16 width direction. A peripheral wall 216 projects from an outer peripheral portion of the bottom wall 214 towards one side in a bottom wall 214 thickness direction. The case 212 is configured overall with a bottomed box shape that is open towards one side in the bottom wall 214 thickness direction.

A circular hole 218 through which the shaft 22 passes is formed substantially in the center of the bottom wall 214 of the case 212. A circular cylinder shaped cylinder portion 220 is provided inside the case 212. The cylinder portion 220 is provided with a large diameter cylinder portion 222. The large diameter cylinder portion 222 is formed in a circular cylinder shape with an inner diameter dimension substantially the same as the inner diameter dimension of the above mentioned circular hole 218. The large diameter cylinder portion 222 projects from the bottom wall 214 coaxially to the circular hole 218 in the same direction as the projection direction of the peripheral wall 216. The cylinder portion 220 is also provided with a small diameter cylinder portion 224. The small diameter cylinder portion 224 is configured with a circular cylinder shape having an inner diameter dimension substantially the same as the inner diameter dimensions of the circular hole 218 and the large diameter cylinder portion 222, and having an outer diameter dimension smaller than the outer diameter dimension of the large diameter cylinder portion 222. The small diameter cylinder portion 224 is formed coaxially to the circular hole 218 and the large diameter cylinder portion 222, and is formed contiguous to the leading end of the large diameter cylinder portion 222 (an end portion at the opposite side of the large diameter cylinder portion 222 to the bottom wall 214).

A pulley 232 serving as a moving body (rotating body) is provided inside the case 212. The pulley 232 is configured in a plate shape with its thickness direction aligned along the thickness direction of the bottom wall 214 (namely, the shaft 22 axial direction). A circular hole 234 is formed in the pulley 232. The circular hole 234 is configured with a circular shape penetrating the pulley 232 with an inner diameter dimension slightly larger than the outer diameter dimension of the large diameter cylinder portion 222 of the cylinder portion 220. The pulley 232 is disposed inside the case 212 in a state in which the large diameter cylinder portion 222 passes through the circular hole 234. The pulley 232 is configured so as to be capable of rotation centered about the large diameter cylinder portion 222.

A wire anchor portion 236 is formed to the pulley 232. The wire anchor portion 236 is formed with a wire anchor hole 237. The wire anchor hole 237 is configured as a bottomed hole that is open towards the direction in which the peripheral wall 216 projects out from the bottom wall 214. An anchor tag (piece) 244 is housed inside the wire anchor hole 237. A length direction base end portion of a wire 242 serving as a coupling member is anchored to the anchor tag 244. A passing groove 248 is formed in the wire anchor portion 236 corresponding to the length direction base end side of the wire 242. The base end side of the wire 242 passes through the passing groove 248 with the anchor tag 244 in a housed state.

An outer peripheral portion of the pulley 232 at the opposite side of the passing groove 248 to the position at which the wire anchor hole 237 is formed configures a winding portion 250. Configuration is made such that the wire 242 that passes through the passing groove 248 can be wound onto the winding portion 250. Slip-off prevention tabs 252 extend towards the rotation radial direction outside of the pulley 232 at both pulley 232 rotation axial direction sides of the winding portion 250. Displacement of the wire 242 wound onto the winding portion 250 in the pulley 232 axial directions is restricted by interference with the slip-off prevention tabs 252 from both pulley 232 axial direction sides, thereby preventing the wire 242 from slipping off the winding portion 250.

The wire 242 passes through a tube 254. The tube 254 is formed with a flexible elongated cord shape, and is configured in a cylinder shape opening at both ends along the center axial line. A metal cylinder body 256 is attached to a length direction base end portion of the tube 254. The metal cylinder body 256 is formed in a cylinder shape with an inner diameter dimension slightly larger than the outer diameter dimension of the tube 254. The length direction base end side of the tube 254 is inserted into the metal cylinder body 256.

The end portion of the metal cylinder body 256 at the length direction base end side of the tube 254 is closed off by a bottom portion of the metal cylinder body 256. Relative displacement of the tube 254 towards the length direction base end side with respect to the metal cylinder body 256 is restricted by the tube 254 contacting the bottom portion of the metal cylinder body 256. A through hole is formed in the bottom portion of the metal cylinder body 256, and the wire 242 extending from the length direction base end portion of the tube 254 passes through the through hole formed in the bottom portion of the metal cylinder body 256 and extends to the outside of the metal cylinder body 256.

A retaining spring mounting hole 258, described in detail later, is formed to the case 212, corresponding to the metal cylinder body 256. The metal cylinder body 256 is disposed to the inside of the retaining spring mounting hole 258. The retaining spring mounting hole 258 is in communication with the inside of the case 212 through a notch portion 260 formed to the case 212. The width dimension of the notch portion 260 is formed smaller than the outer diameter dimension of the metal cylinder body 256, and formed larger than the outer diameter dimension of the wire 242. The wire 242 extending from the through hole in the bottom portion of the metal cylinder body 256 extends to the inside of the case 212 passing through the notch portion 260.

A length direction leading end of the thus configured tube 254 is anchored to a lower end portion of a sensor housing operation section 272, illustrated in FIG. 10, and a leading end side of the wire 242 that passes through the tube 254 enters inside the sensor housing operation section 272. Inside the sensor housing operation section 272, a take-up pulley, not shown in the drawings, is supported so as to be capable of rotating about an axis with an axial direction oriented in the same direction as the rotation axial direction of the sensor housing 102 with respect to the frame 14. The leading end side of the wire 242 is taken up onto the take-up pulley, and the leading end of the wire 242 is anchored to the take-up pulley.

An external gear is integrally provided coaxial to the take-up pulley. A sector gear is supported so as to be capable of rotating at the lateral side of the external gear. The rotating axial direction of the sector gear is configured in the same direction as the rotation axial direction of the external gear, and the sector gear meshes with the external gear. The rotation shaft of the sector gear is coupled to the rotation shaft of the sensor housing 102, and the sensor housing 102 is configured so as to be capable of rotation with respect to the frame 14 interlockingly with rotating of the sector gear at least within a specific range.

A biasing section, not shown in the drawings, configured by for example a torsion coil spring or the like, is also provided inside the sensor housing operation section 272. The biasing section biases the take-up pulley inside the sensor housing operation section 272 towards the wire 242 take-up direction.

As shown in FIG. 1, a lid 302 is provided at the opening side of the case 212. The lid 302 is formed in a plate shape with its thickness direction aligned along the thickness direction of the bottom wall 214. The open end of the case 212 is closed off by the lid 302. A through hole 304 is formed in the lid 302, and the shaft 22 that has passed through the cylinder portion 220 of the case 212 passes through the through hole 304.

Through holes 306 are formed at three locations at the periphery of the through hole 304. Bosses 312 are formed in the case 212 at three locations corresponding to the through holes 306. The through holes are formed penetrating the bosses 312 in the bottom wall 214 thickness direction, and the lid 302 is fastened and integrally fixed to the case 212 by fastening members 322 such as screws or bolts that pass through the through holes 306 from the opposite side of the lid 302 to the case 212.

An operation section 344 of an operation plate 342 serves as a rotation transmission member and is provided between the lid 302 and the pulley 232. The operation section 344 is formed in a plate shape with the thickness direction aligned with the thickness direction of the bottom wall 214. A circular hole 346 is formed to the operation section 344, and the shaft 22 that has passed through the large diameter cylinder portion 222 then passes through the circular hole 346.

A fixing tab (piece) 348 extends from a portion of the outer periphery of the operation section 344. A leading end side of the fixing tab 348 is fixed to a frame (such as the framework) of the seat cushion 18. Thus in the present exemplary embodiment the case 212 turns with respect to the operation plate 342 when the seat back 20 tilts with respect to the seat cushion 18.

A pressing tab (piece) 350 is also formed to a portion of the outer periphery of the operation plate 342. The pressing tab 350 extends towards the bottom wall 214 side of the case 212. A slit hole 352 is formed to the pulley 232 corresponding to the pressing tab 350. The slit hole 352 is formed in a curved slit shape with a center of curvature at the center of rotation of the pulley 232. A leading end side of the pressing tab 350 enters inside the slit hole 352.

As described above, the wire 242 is constantly biased towards the length direction leading end side thereof by biasing force of the wire biasing section provided to the sensor housing operation section 272. The pulley 232 is accordingly constantly biased in the rear tilt arrow direction in FIG. 2, and the end portion 354 at the length direction front tilt arrow direction side of the slit hole 352 is in press contact with the pressing tab 350.

Figure 2:
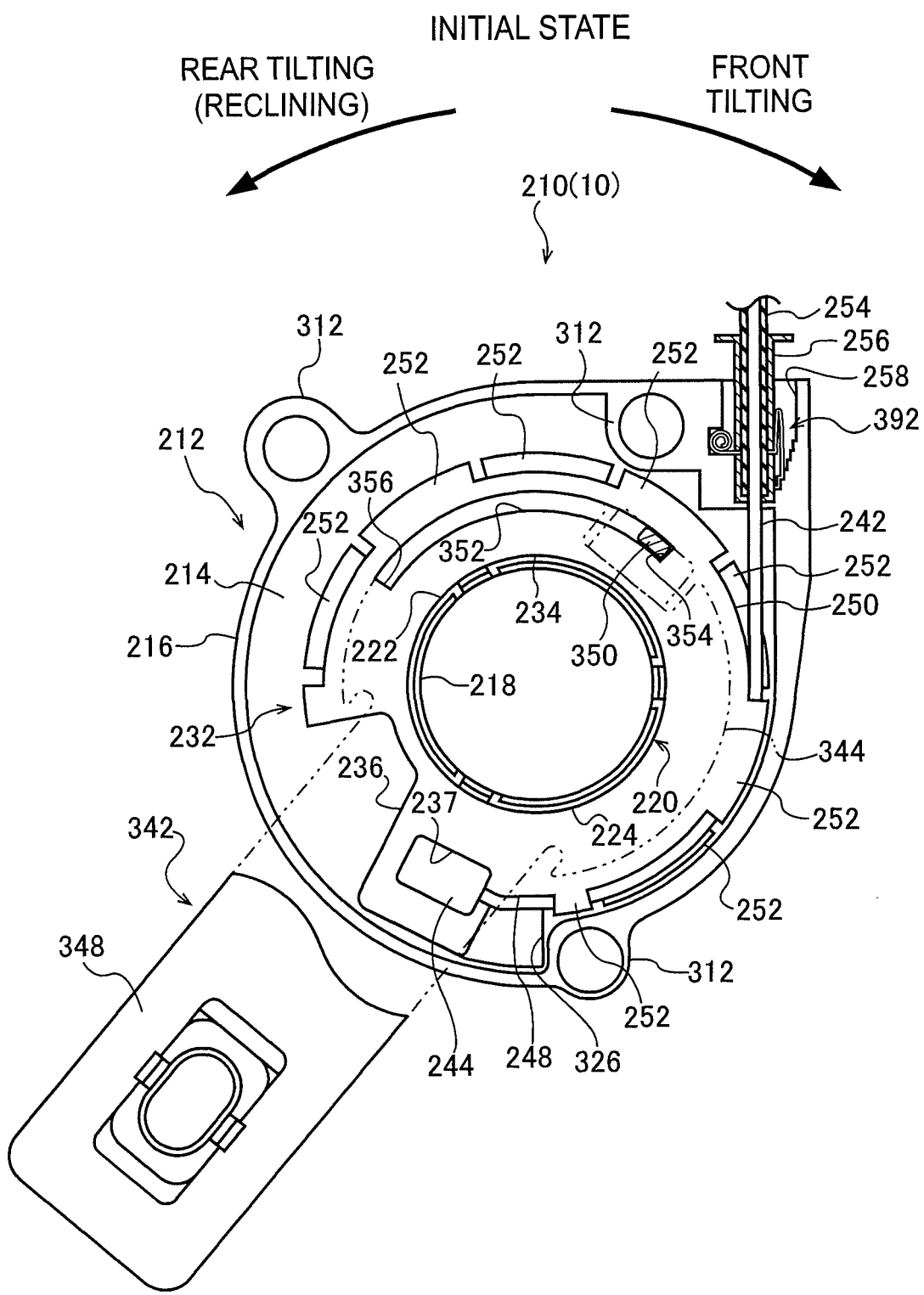
FIG. 2 is a side view illustrating a tilt detection section.

When the case 212 integrated to the seat back 20 rotates in the rear tilt (reclining) arrow direction in FIG. 2, and the pulley 232 attempts to rotate in the rear tilt (reclining) arrow direction together with the case 212, the pressing tab 350 formed to the operation plate 342 that is integrated to the seat cushion 18 accordingly contacts the end portion 354 of the slit hole 352, thereby restricting rotation of the pulley 232 in the rear tilt (reclining) arrow direction. Accordingly, the length direction base end of the wire 242 is pulled and moved by the pulley 232 when the case 212 rotates in the rear tilt (reclining) arrow direction relative to the pulley 232.

A restriction portion 326 is formed inside the case 212. When the wire anchor portion 236 contacts the restriction portion 326, the pulley 232 is unable to rotate any further in the front tilt arrow direction in FIG. 2. When, in this state, the case 212 rotates in the front tilt arrow direction in FIG. 2, the pressing tab 350 of the operation plate 342 moves relatively within the slit hole 352 so as to move away from the end portion 354 and to approach an end portion 356 at the opposite end of the slit hole 352 to the end portion 354.

Figure 5:
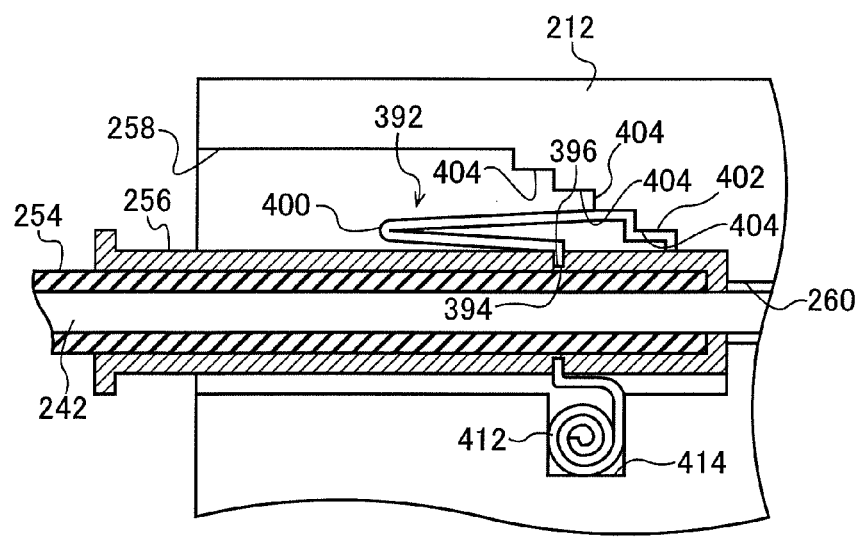
FIG. 5 is an enlarged cross-section illustrating a relevant portion of a tilt detection section.

In the retaining spring mounting hole 258 described above, a spring 392 serving as a resilient (elastic) press contact (abut) member and configuring a retention section with the metal cylinder body 256 (retention portion). As shown in FIG. 1, FIG. 2 and FIG. 5, the spring 392 is configured in a plate shape with its width direction aligned along the rotation axial direction of the pulley 232, and the spring 392 is appropriately bent or curved at appropriate positions thereof in its length direction about an axis whose axial direction being along the spring 382 width direction. A fitting portion 394 is formed at a length direction intermediate portion of the spring 392 as a hole penetrating the spring 392 in the thickness direction, or as a notch penetrating the spring 392 in the thickness direction and opening at a width direction one end.

A fitting groove 396 is formed in the metal cylinder body 256 corresponding to the fitting portion 394. The fitting groove 396 is configured as a ring shaped groove opening at an outer peripheral portion of the metal cylinder body 256. The spring 392 is attached to the metal cylinder body 256 by the fitting portion 394 of the spring 392 entering inside the fitting groove 396. Relative movement of the spring 392 with respect to the metal cylinder body 256 is accordingly restricted both towards the metal cylinder body 256 opening direction side and the bottom portion 286 side.

In the spring 392, a bent portion 400 is formed at a one end side further than the fitting portion 394, and the one end side of the spring 392 further than the bent portion 400 (namely the opposite side to the fitting portion 394) is biased in a direction moving away from the metal cylinder body 256. A spring-side step portion 402 is formed at the one end side of the spring 392 further than the bent portion 400 in the spring 392 length direction. The spring-side step portion 402 is formed by bending the vicinity of the length direction one end portion of the spring 392 into a hook shape about an axis whose axial direction being along the spring 392 width direction.

A mounting portion-side step portion 404 is formed at a portion of the inner wall of the retaining spring mounting hole 258, which portion faces the spring-side step portion 402 at the opposite side of the spring-side step portion 402 to the metal cylinder body 256. The mounting portion-side step portion 404 is formed so as to be contactable (abutable) by the spring-side step portion 402. However, the number of steps of the mounting portion-side step portion 404 is set greater than that of the spring-side step portion 402.

The spring 392 is bent into a spiral shape about an axis whose axial direction being along the spring 392 width direction, so as to configure a rolled-up portion 412, at the other end side of the spring 392 further than the fitting portion 394. The rolled-up portion 412 is housed in a housing hole 414 formed to the inner wall of the retaining spring mounting hole 258 at the opposite side to the mounting portion-side step portion 404.

Operation and Advantageous Effects of the Present Exemplary Embodiment

Explanation follows regarding operation and advantageous effects of the present exemplary embodiment.

In the webbing take-up device 10, when there is a sudden vehicle deceleration, the spherical body 110 on the curved face 106 formed to the placement portion 104 of the sensor housing 102 of the acceleration sensor 82 rises up whilst moving towards an edge portion side of the curved face 106. The thus moving spherical body 110 pushes the bottom face of the hat portion 134 upwards, thereby rotating (swinging) the sensor lever 130 upwards about the support shaft 124.

When the sensor lever 130 swings in this way, the pressing projection 136 formed to the hat portion 134 pushes the lower face of the pressure receiving plate 184 of the V-pawl 180 upwards, swinging the V-pawl 180 about the support shaft 178. In the thus swung V-pawl 180, the engagement claw 186 rises and meshes with the ratchet teeth formed to the outer peripheral portion of the V-gear 64. Rotation of the V-gear 64 in the pull-out direction is accordingly restricted.

The webbing 38 is pulled when an occupant wearing the webbing 38 moves towards the vehicle front under inertia due to sudden vehicle deceleration. The spool 36 rotates in the pull-out direction when the webbing 38 is pulled. The lock base 54 is connected to the spool 36 through the energy absorption section described above. Relative rotation of the lock base 54 with respect to the spool 36 thus is restricted and so the lock base 54 rotates in the pull-out direction due to the spool 36 rotating in the pull-out direction.

Relative rotation of the lock base 54 with respect to the V-gear 64 in the pull-out direction occurs when the lock base 54 rotates together with the spool 36 in the pull-out direction in a state in which relative rotation of the V-gear 64 in the pull-out direction is restricted due to the engagement claw 186 of the V-pawl 180 meshing with the ratchet teeth of the V-gear 64 as described above. When such relative rotation between the V-gear 64 and the lock base 54 occurs, from the pawl housing portion 56 formed to the lock base 54, the locking pawl 58 moves such that a portion of the locking pawl 58 projects from the pawl housing portion 56. The ratchet teeth at the leading end side of the locking pawl 58 thereby mesh with the ratchet teeth of the ratchet hole 60 formed in the leg plate 32.

Rotation of the lock base 54 in the pull-out direction and rotation of the spool 36 in the pull-out direction is restricted due to the ratchet teeth of the locking pawl 58 meshing with the ratchet teeth of the ratchet hole 60. The webbing 38 is accordingly restricted from being pulled out from the spool 36, enabling the body of the occupant moving towards the vehicle front under inertia to be effectively restrained by the webbing 38.

The take-up device main body 12 configuring the webbing take-up device 10 is installed in the seat back 20 of the seat 16 as described above. The seat 16 is provided with what is referred to as a reclining mechanism for tilting the seat back 20 about the shaft 22 with respect to the seat cushion 18. The take-up device main body 12 installed in the seat back 20 turns about the shaft 22 and tilts when the seat back 20 is tilted with respect to the seat cushion 18.

In the webbing take-up device 10, when the seat back 20 is tilted such that the upper end side of the seat back 20 inclines towards the rear of the seat 16, the case 212 that is fixed to the frame of the seat back 20 rotates in the direction of the rear tilt arrow (reclining) in FIG. 2 from the state illustrated in FIG. 2. However, since the fixing tab 348 of the operation plate 342 of the reclining sensor 210 is fixed to the frame of the seat cushion 18, the operation plate 342 does not turn even though the seat back 20 is tilted. In this state, the case 212 accordingly relatively rotates in the direction of the rear tilt arrow (reclining) in FIG. 2 with respect to the operation plate 342.

Figure 3:
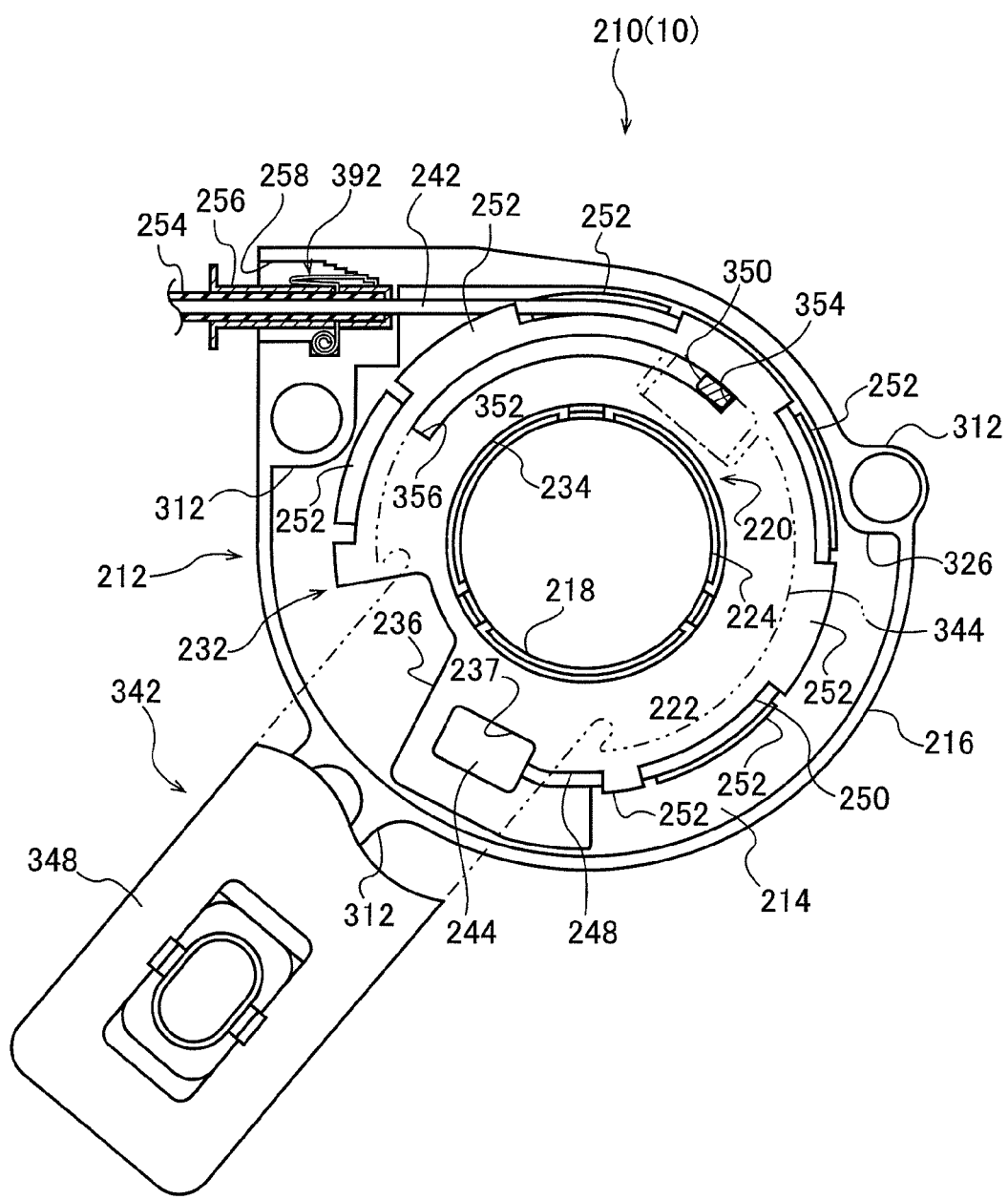
FIG. 3 is a side view corresponding to FIG. 2 and illustrating a rear tilted (reclining) state.

When the pulley 232 attempts to turn together with the case 212 in this state, the pressing tab 350 of the operation plate 342 interferes with the end portion 354 of the slit hole 352, and rotation of the pulley 232 in the rear tilt arrow (reclining) direction is restricted. The case 212 accordingly rotates in this state relative to the pulley 232 in the rear tilt arrow (reclining) direction in FIG. 2. As shown in FIG. 3, when such relative rotation occurs, the wire anchor portion 236 of the pulley 232 moves away from the retaining spring mounting hole 258 of the case 212 in the front tilt arrow direction (namely in the opposite direction to the rotation direction of the case 212 with respect to the pulley 232).

The metal cylinder body 256 provided at the length direction base end portion of the tube 254 is anchored to the retaining spring mounting hole 258 of the case 212, and the anchor tag 244 provided at the length direction base end portion of the wire 242 is anchored to the wire anchor portion 236 of the pulley 232. Accordingly, when the wire anchor portion 236 of the pulley 232 moves away from the retaining spring mounting hole 258 of the case 212 in the front tilt arrow direction in FIG. 2, the wire 242 moves inside the tube 254 towards the length direction base end side against the biasing force of the wire biasing section in the sensor housing operation section 272.

Figure 8:
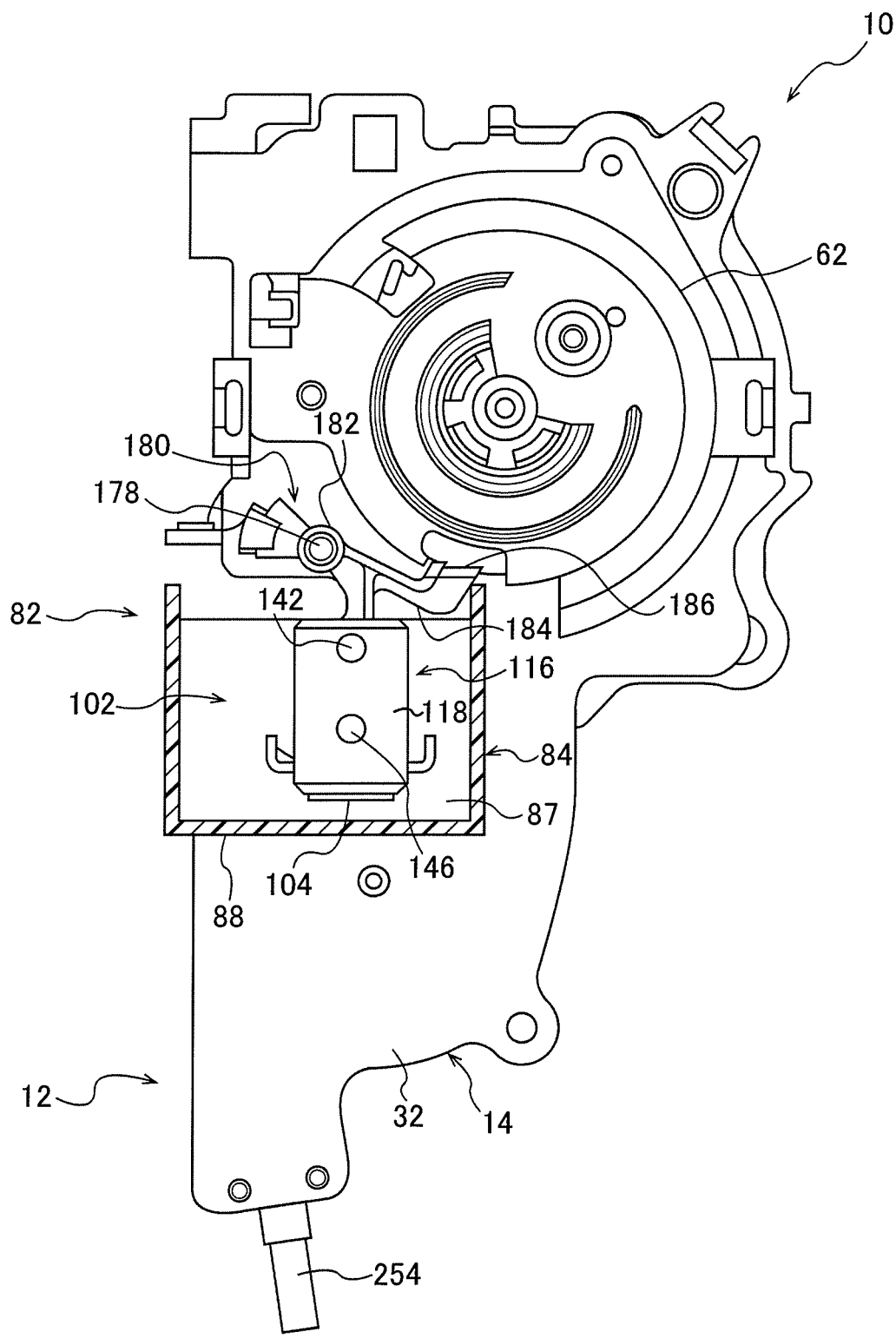
FIG. 8 is a side view schematically illustrating a take-up device main body and an acceleration sensor.
Figure 9:
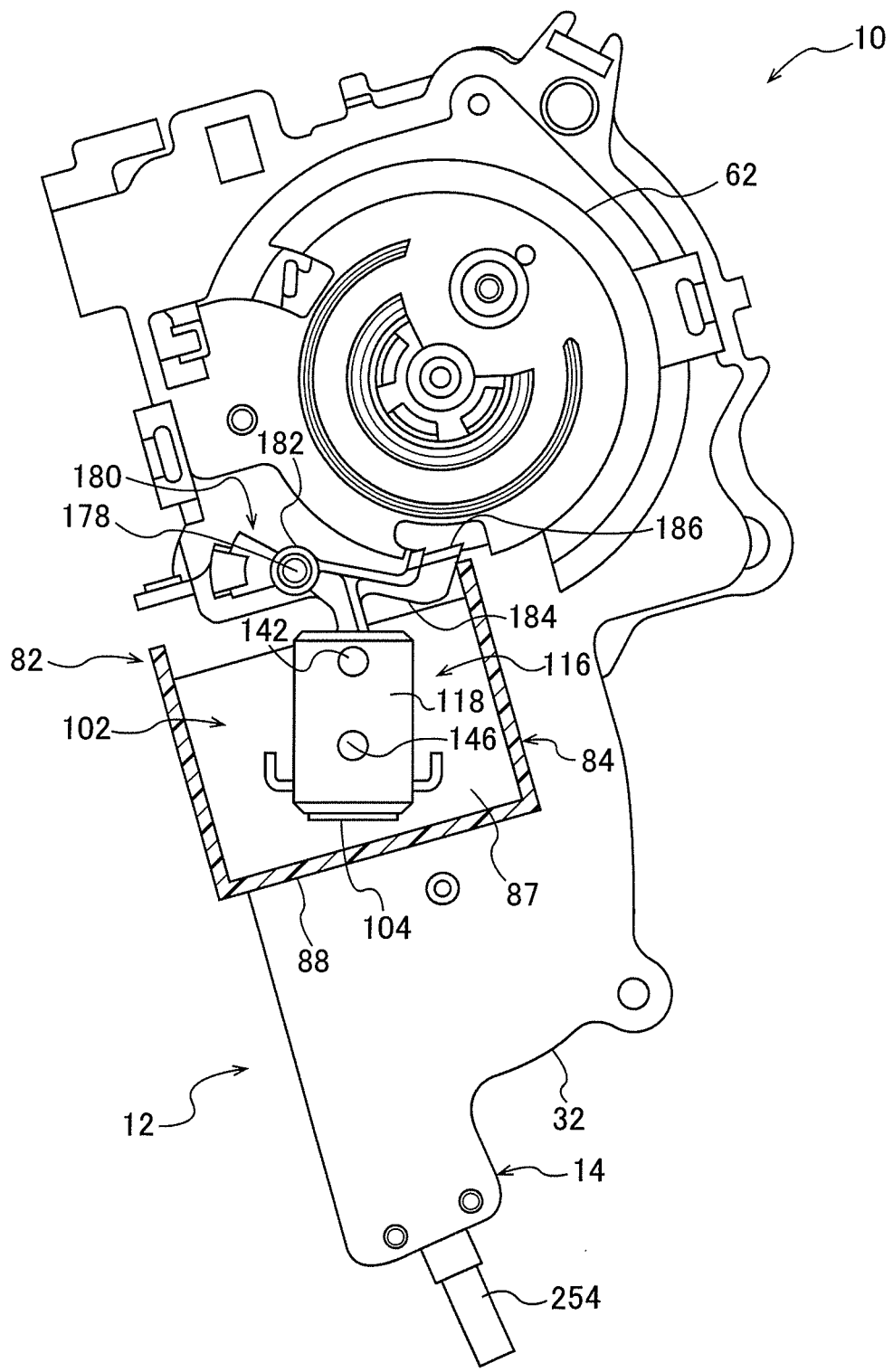
FIG. 9 is a side view corresponding to FIG. 8 illustrating a take-up device main body in a tilted state.

Inside the sensor housing operation section 272, the length direction leading end of the wire 242 accordingly moves towards the base end side, and the take-up pulley on which the leading end side of the wire 242 is taken up inside the sensor housing operation section 272 rotates, turning (swinging) the sector gear that is integrated to the take-up pulley. Due to the sector gear thus turning, as shown in FIG. 9, the sensor housing 102 of the acceleration sensor 82 accordingly turns with respect to the frame 14, from the state illustrated in FIG. 8, so as to cancel out tilting of the frame 14. The original orientation (an orientation in which the upper face of the placement portion 104 faces vertically upwards) of the sensor housing 102 is accordingly maintained due to the sensor housing 102 turning with respect to the frame 14. The spherical body 110 can accordingly be prevented from rolling around unintentionally (although the vehicle has not suddenly decelerated) even when the take-up device main body 12 is tilted together with the seat back 20.

When the seat back 20 is tilted such that the upper end side of the seat back 20 inclines towards the front of the seat 16 and the seat 16 is folded up, the case 212 that is fixed to the frame of the seat back 20 rotates relatively with respect to the operation plate 342 in the front tilt arrow direction in FIG. 2 from the state illustrated in FIG. 2. When the wire anchor portion 236 contacts (abuts) the restriction portion 326 formed at the inside of the case 212 in this state, the pulley 232 is unable to relatively rotate any further in the front tilt arrow direction in FIG. 2.

Figure 4:
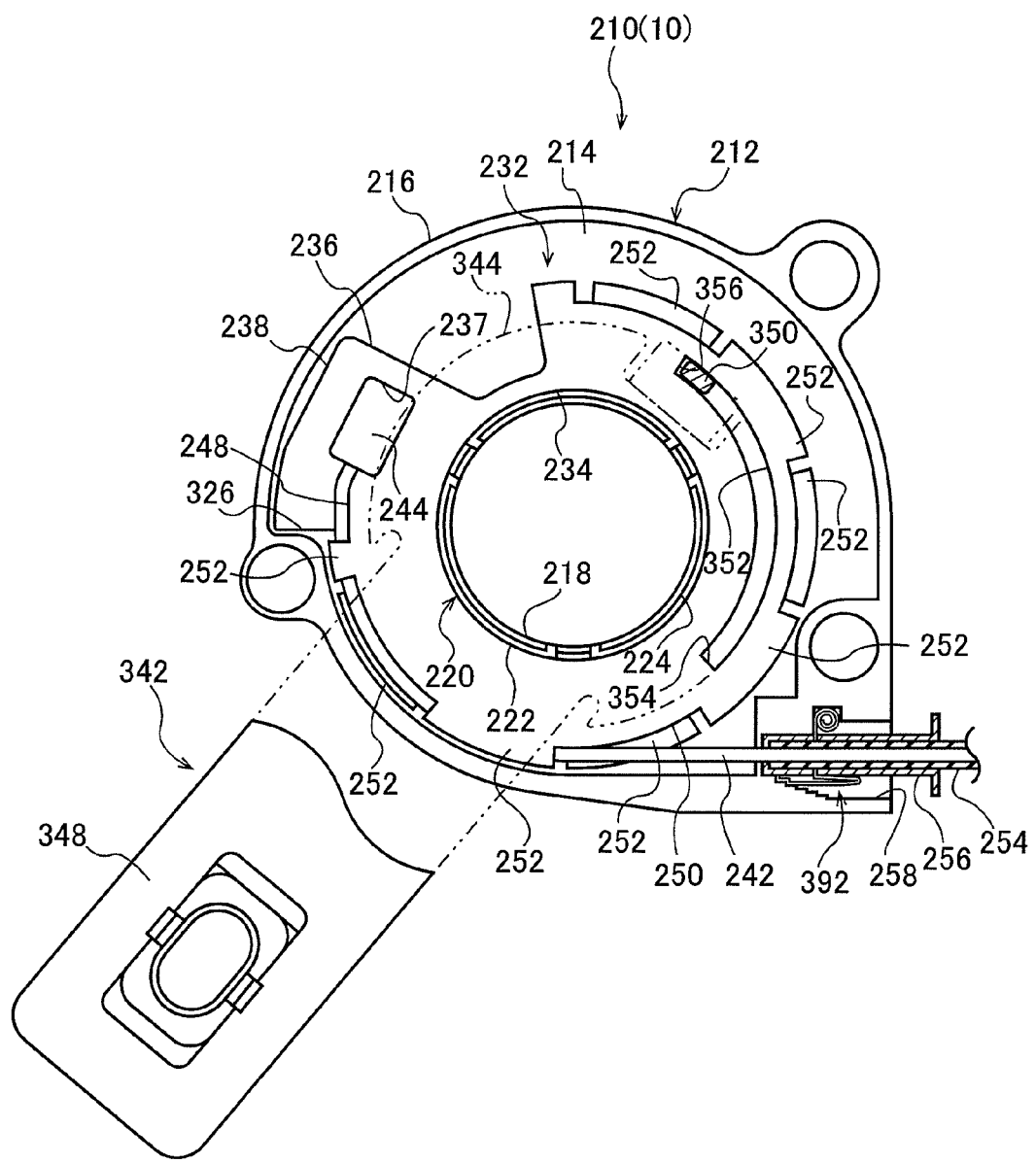
FIG. 4 is a side view corresponding to FIG. 2 and illustrating a front tilted state.

In this state, when the case 212 rotates further in the front tilt arrow direction in FIG. 2, as shown in FIG. 4, the pressing tab 350 of the operation plate 342 undergoes relative movement within the slit hole 352 to move away from the end portion 354 and approach the end portion 356 on the opposite side of the slit hole 352 to the end portion 354. Accordingly, when the seat back 20 is tilted forwards and the case 212 rotates in the front tilt direction, the case 212 rotates, however the pulley 232 does not rotate. The wire 242 is therefore not operated, and the sensor housing 102 tilts together with the seat back 20.

As shown in FIG. 5, in the webbing take-up device 10, the spring-side step portion 402 of the spring 392, due to biasing force, is in press contact to the mounting portion-side step portion 404 of the retaining spring mounting hole 258, so retaining the metal cylinder body 256, and therefore also the length direction base end portion of the tube 254, in the case 212 due to friction between the spring-side step portion 402 and the mounting portion-side step portion 404. When the tube 254 and the metal cylinder body 256 are pulled towards a tube 254 length direction leading end side by force acting against the friction between the spring-side step portion 402 and the mounting portion-side step portion 404, the metal cylinder body 256 moves accompanying the spring 392 towards the opening side of the retaining spring mounting hole 258.

Figure 6:
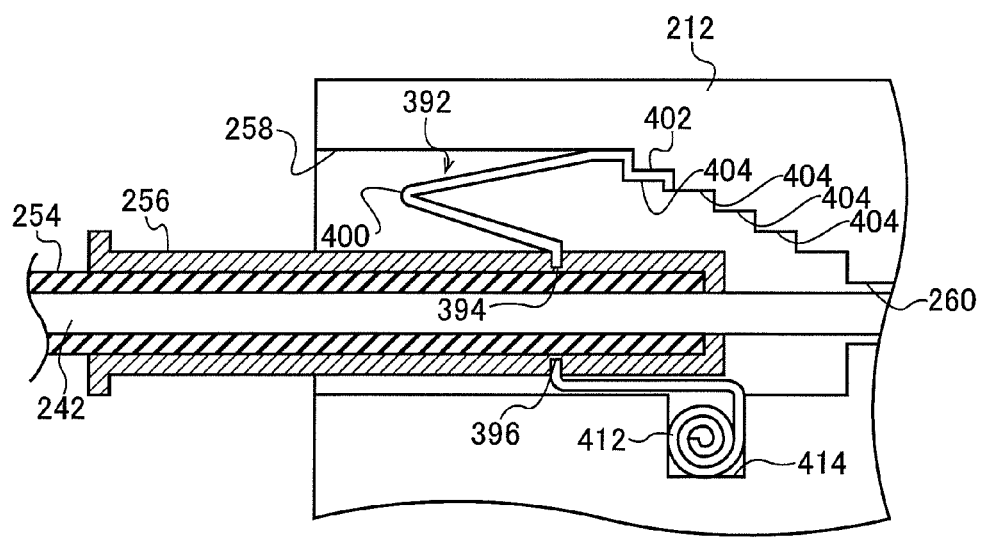
FIG. 6 is a cross-section corresponding to FIG. 5 illustrating a state in which a base end side of a tube has moved.

The spring 392 thus moves together with the metal cylinder body 256 such that the spring-side step portion 402 faces a step of the mounting portion-side step portion 404 which step is further to the retaining spring mounting hole 258 opening side than a step of the mounting portion-side step portion 404 with which it was hitherto in contact. When this occurs, the spring-side step portion 402 moves in a direction away from the metal cylinder body 256 due to the biasing force of the spring 392, and makes press contact with the new step of the mounting portion-side step portion 404, as shown in FIG. 6. When the pulling on the tube 254 or the metal cylinder body 256 is released in this state, the length direction other end of the metal cylinder body 256 is once again retained in the case 212 by friction between the spring-side step portion 402 and the mounting portion-side step portion 404.

Accordingly, when the length direction base end of the tube 254 has moved towards the retaining spring mounting hole 258 opening side, the wire 242 is relatively pulled out from the base end of the tube 254 unless the pulley 232 rotates and there is a change in the position of the anchor tag 244. The length direction leading end side of the wire 242 is accordingly pulled into the tube 254 by an amount corresponding to the length of the wire 242 that has been pulled out from the base end of the tube 254, and the sensor housing 102 turns accordingly. During assembly of the webbing take-up device 10 to the seat back 20 of the seat 16, the turn position of the sensor housing 102 can accordingly be adjusted by moving the tube 254 length direction base end so as to move out from the retaining spring mounting hole 258.

Moreover, in such initial position adjustment, only the position of the base end of the tube 254 is moved, with no change to the position of the anchor tag 244. It is accordingly sufficient to provide the anchor tag housing portion 240 with merely enough space to house the anchor tag 244, there being no need to consider for example a movement amount of the anchor tag 244 for initial position adjustment. A reduction in size of the pulley 232 is accordingly possible.

The above adjustment is possible even after the case 212 has been closed off by the lid since the tube 254 and the metal cylinder body 256 can be pulled from outside the case 212. The adjustment operation is accordingly made easier, with no need to open and close the lid in order to perform the above adjustment.

First Modified Example

Figure 12:
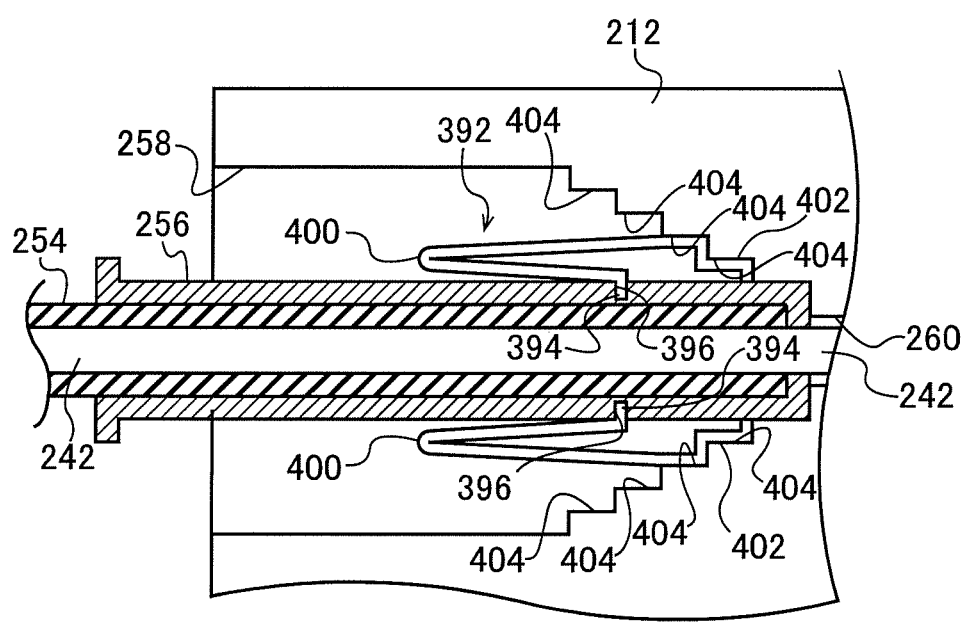
FIG. 12 is an enlarged cross-section illustrating a relevant portion of a first modified example of a tilt detection section.

In the present exemplary embodiment, the bent portion 400 and the spring-side step portion 402 are only formed at the spring 392 length direction one end side, however for example as shown in the first modified example in FIG. 12, the bent portions 400 and the spring-side step portions 402 may be formed at both length direction end sides of the spring 392, and mounting portion-side step portions 404 may be formed to the inner walls of the retaining spring mounting hole 258 corresponding to the spring-side step portions 402 on both sides.

In the present exemplary embodiment, configuration is made wherein the metal cylinder body 256, and therefore also the base end of the tube 254, are retained indirectly to the case 212 due to friction between the spring-side step portion 402 and the mounting portion-side step portion 404 caused by the resilient press contact of the spring-side step portion 402 of the spring 392 against the mounting portion-side step portion 404 of the retaining spring mounting hole 258. However, as shown in the following modified example, configurations to retain the length direction base end of the tube 242 to the case 212 so as to be capable of movement along the wire 242 length direction is not limited thereto.

Second Modified Example

Figure 13:
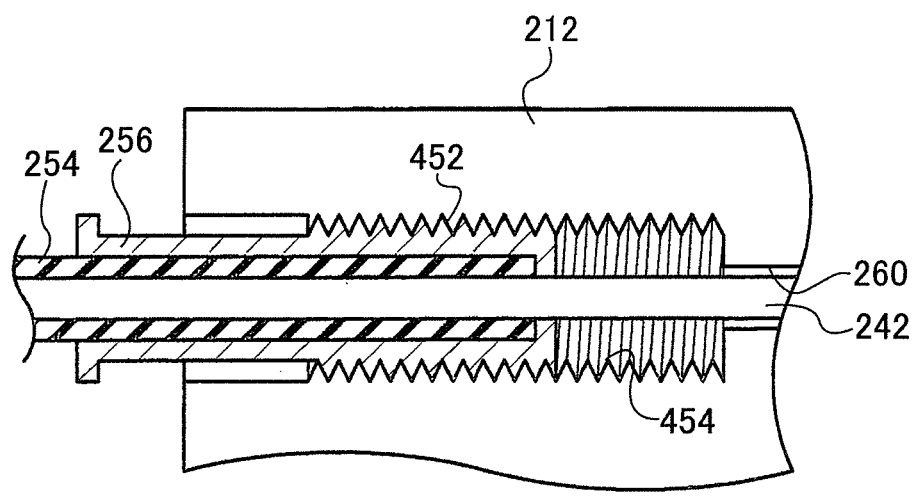
FIG. 13 is an enlarged cross-section illustrating a relevant portion of a second modified example of a tilt detection section.
Figure 14:
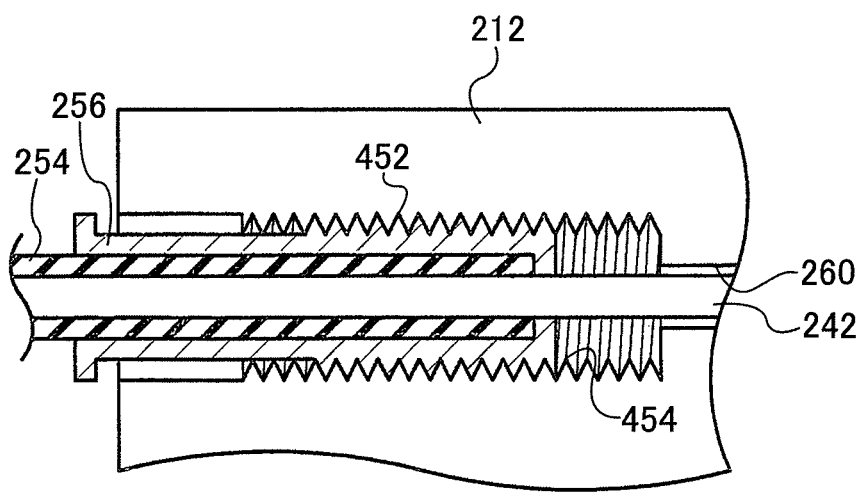
FIG. 14 is a cross-section corresponding to FIG. 13 illustrating a state in which a base end side of a tube has moved.

FIG. 13 and FIG. 14 are drawings corresponding to FIG. 5 and FIG. 6 and show a second modified example of the present exemplary embodiment. As shown in FIG. 13 and FIG. 14, in this modified example, a male thread portion 452 configuring a retention section is formed at an outer peripheral portion of the metal cylinder body 256. A female thread hole 454 serving as a female thread portion, so as to correspond to the male thread portion 452, that configures the retention section together with the male thread portion 452 is formed in place of the retaining spring mounting hole 258 of the case 212.

A one end of the female thread hole 454 is open at an outer peripheral portion of the case 212, and the other end is in communication with the inside of the case 212 through the notch portion 260. A female thread is formed to at least a portion of an inner peripheral portion of the female thread hole 454 between the one end and the other end of the female thread hole 454. The male thread portion 452 is screwed into the female thread of the female thread hole 454.

As shown in FIG. 13, the metal cylinder body 256 moves along its center axis (namely along the wire 242 length direction) when the metal cylinder body 256 is rotated about its center axis. The base end of the tube 254 accordingly moves towards the wire 242 length direction leading end side or towards the length direction base end side. Such a configuration exhibits similar advantageous effects to the advantageous effects of the present exemplary embodiment described above.

Third Modified Example

Figure 15:
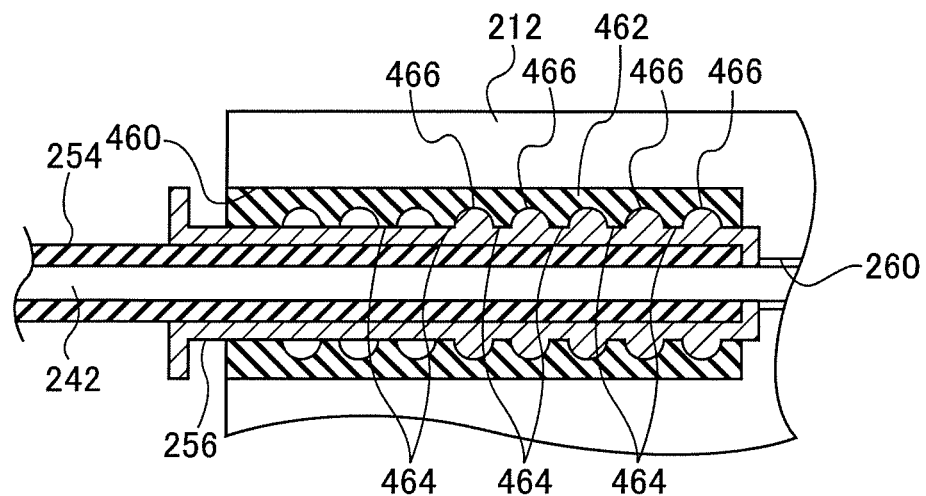
FIG. 15 is an enlarged cross-section illustrating a relevant portion of a third modified example of a tilt detection section.
Figure 16:
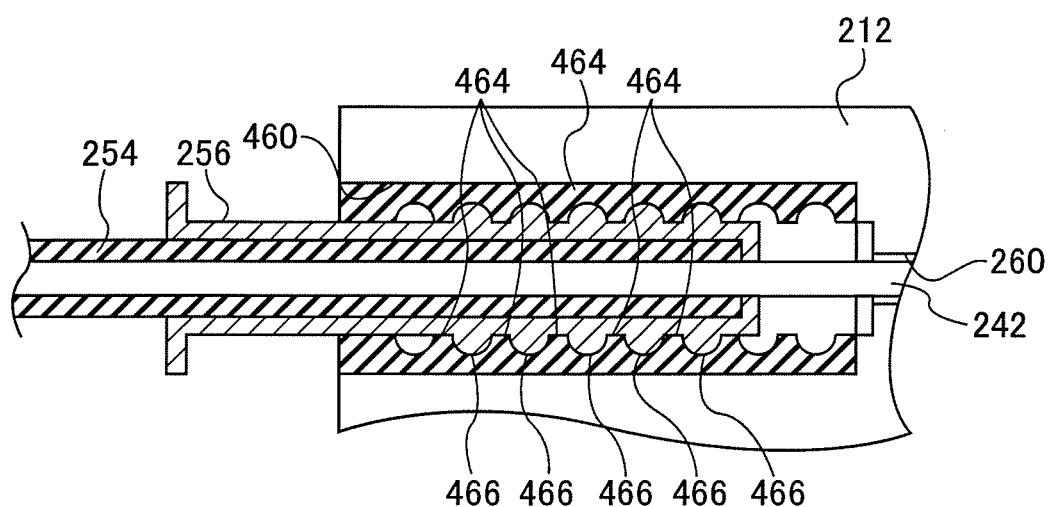
FIG. 16 is a cross-section corresponding to FIG. 15 illustrating a state in which a base end side of a tube has moved.
Figure 17A:
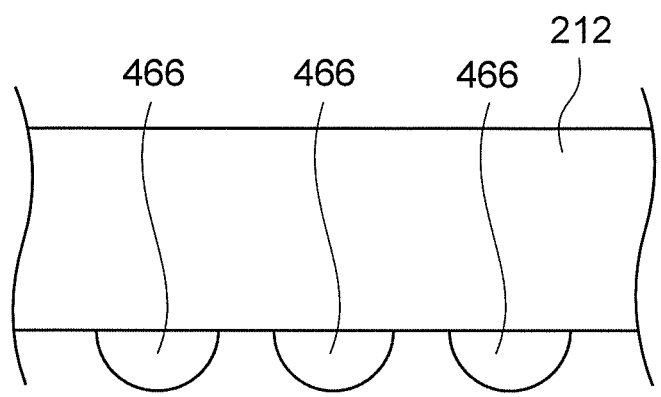
FIGS. 17A and 17B are enlarged cross-sections illustrating a relevant portion another example of the third modified example of the tilt detection section.
Figure 17B:
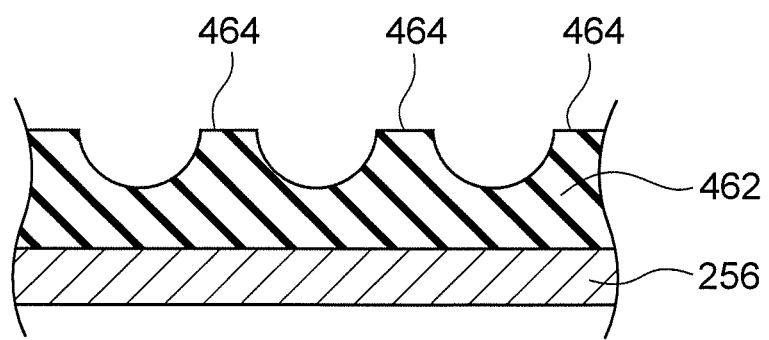

FIG. 15 and FIG. 16 are cross-sections corresponding to FIG. 5 and FIG. 6 and show a third modified example of the present exemplary embodiment. As shown in FIG. 15 and FIG. 16, in this modified example, the case 212 is not formed with the retaining spring mounting hole 258 having the mounting portion-side step portion 404, but is instead formed with an interference block mounting hole 460. An interference block 462, formed from for example a rubber material or synthetic resin material having a similar resilience (elastic) to rubber, is mounted in the interference block mounting hole 460.

The inner peripheral shape of the interference block 462 is formed as a cylinder shape with it being larger than the outer peripheral shape of the metal cylinder body 256. In the inner peripheral portion of the interference block 462, with specific intervals along the metal cylinder body 256 axial direction, plural resilient (elastic) interference portions 464 that configure the retention section. The resilient interference portions 464 are formed projecting towards the inner side of the interference block 462, and face, along the axial direction, ring shaped contact (abut) projections 466 of the metal cylinder body 256 that serve as contact portions formed projecting from an outer peripheral portion of the metal cylinder body 256.

Such a configuration restricts movement of the metal cylinder body 256 towards the wire 242 length direction leading end side, and therefore also restricts movement of the base end of the tube 254 towards the wire 242 length direction leading end side, due to the resilient interference portions 464 contacting (abutting) and interfering with the contact projections 466.

Here, in a contacting state of the resilient interference portions 464 and the contact projections 466 at the opening side of the interference block mounting hole 460, the resilient interference portions 464 undergo resilient deformation when the metal cylinder body 256 is pulled towards the wire 242 length direction leading end side with a force against (overcoming) the resilience of the resilient interference portions 464. As shown in FIG. 16, the contact projections 466 accordingly ride over the resilient interference portions 464 and move towards the opening side of the interference block mounting hole 460. The base end of the tube 254 accordingly moves towards the wire 242 length direction leading end side. Such a configuration also exhibits similar advantageous effects to the advantageous effects of the present exemplary embodiment described above.

It is possible that the interference block 462 (the resilient interference portions 464), formed from for example a rubber material or synthetic resin material having a similar resilience (elastic) to rubber, is formed at the metal cylinder body 256 side, and the contact projections 466 are formed at the case 212 side.

What is claimed is:

1. A webbing take-up device comprising:
a take-up device main body that is provided at a seat back that is capable of tilting with respect to a seat cushion configuring a vehicle seat about an axis whose axial direction is along a width direction of the seat, the take-up device main body including a spool on which a webbing is taken up by rotation in a take-up direction, and a locking mechanism that restricts, by actuating, rotation of the spool in a pull-out direction that is an opposite direction to the take-up direction;
an acceleration sensor that includes a housing on which is placed an inertia mass body that actuates the locking mechanism by inertia moving, the housing being provided at the take-up device main body so as to be capable of turning with respect to the take-up device main body about a specific turning axis;
a tilt detection section including a support body that is provided at the seat back and spaced apart from the take-up device main body, and including a moving body that is provided at the support body and that moves relative to the support body accompanying tilting of the seat back with respect to the seat cushion;
an elongated coupling member whose leading end in a length direction thereof is anchored to the housing of the acceleration sensor and whose base end in the length direction is anchored to the moving body of the tilt detection section, the coupling member turning the housing of the acceleration sensor with respect to the take-up device main body by moving together with the moving body;
a tube-shaped tube whose leading end in a length direction thereof is directly or indirectly integrally anchored to the take-up device main body and whose base end in the length direction is retained directly or indirectly at the support body of the tilt detection section so as to be capable of moving with respect to the support body of the tilt detection section towards at least one of a side of the base end in the length direction of the coupling member or a side of the leading end in the length direction of the coupling member, the coupling member passing through the inside of the tube so as to be movable along the length direction, and
a retention section to which the base end of the tube is anchored and that is retained at the support body of the tilt detection section, the retention section being retainable at different positions on the support body by being operated towards at least one of the side of the base end in the length direction of the coupling member or the side of the leading end in the length direction of the coupling member with respect to the support body.

2. The webbing take-up device of claim 1, wherein movement of the retention section along the length direction of the coupling member with respect to the support body is restricted by friction between the retention section and the support body due to the retention section being in resilient press contact with the support body.

3. The webbing take-up device of claim 2, wherein the retention section is configured including a retention portion that is moved by being operated and to which the base end of the tube is anchored, and a resilient press contact member that is attached to the retention portion and that is movable by the retention portion being moved, the resilient press contact member being in resilient press contact with the support body.

4. The webbing take-up device of claim 1, wherein the retention section comprises a male thread portion that is screwed with a female thread portion formed at the support body, and that is moved, being guided by the female thread portion, in the length direction of the coupling member by the male thread portion rotating about a center axis line of the female thread portion.

5. The webbing take-up device of claim 4, wherein the male thread portion is formed on an outer peripheral portion of a retention portion configuring the retention section that is moved by being operated and to which the base end of the tube is anchored, and the male thread portion is screwed with the female thread portion which is a female thread hole formed at the support body.

6. The webbing take-up device of claim 1, wherein the retention section comprises:

a contact portion that is provided at either the support body or the tube side; and a resilient interference portion that is provided at whichever of the support body or the tube side is not provided with the contact portion, that is formed so as to be softer than the contact portion and capable of resilient deformation, and that faces the contact portion along the length direction of the coupling member at a base end side of the tube, the resilient interference portion interfering with the contact portion to restrict relative displacement of the contact portion in the length direction of the coupling member, and undergoing resilient deformation by a pushing force of a specific magnitude or greater from the contact portion along the length direction of the coupling member to release restriction of the contact portion from relative displacement.

7. The webbing take-up device of claim 6, wherein the retention section is configured including a retention portion that is moved by being operated and to which the base end of the tube is anchored, and the contact portion is provided at the retention portion, and the resilient interference portion is provided at the support body.

8. The webbing take-up device of claim 6, wherein the retention section is configured including a retention portion that is moved by being operated and to which the base end of the tube is anchored, and the resilient interference portion is provided at the retention portion, and the contact portion is provided at the support body.

* * * * *